United States Patent
Singh et al.

(10) Patent No.: US 10,572,452 B1
(45) Date of Patent: Feb. 25, 2020

(54) CONTEXT-BASED READ-AHEAD FOR B+ TREE DATA STRUCTURES IN A DEDUPLICATION SYSTEM

(71) Applicant: EMC IP Holding Company LLC, Hopkinton, MA (US)

(72) Inventors: Pranay Singh, Santa Clara, CA (US); George Mathew, Belmont, CA (US); Pengju Shang, Milpitas, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 305 days.

(21) Appl. No.: 14/588,443

(22) Filed: Jan. 1, 2015

(51) Int. Cl.
*G06F 16/174* (2019.01)
*G06F 16/22* (2019.01)

(52) U.S. Cl.
CPC ...... *G06F 16/1748* (2019.01); *G06F 16/2246* (2019.01)

(58) Field of Classification Search
CPC . G06F 3/0641; G06F 16/1748; G06F 16/2246
See application file for complete search history.

(56) References Cited

U.S. PATENT DOCUMENTS

| | | | | |
|---|---|---|---|---|
| 5,483,651 A * | 1/1996 | Adams | ........... | G06F 17/245 |
| 5,909,540 A * | 6/1999 | Carter | ........... | G06F 9/5016 |
| | | | | 707/E17.12 |
| 7,216,203 B1 * | 5/2007 | Bagewadi | ............ | G06F 3/0611 |
| | | | | 707/E17.01 |
| 9,720,619 B1 * | 8/2017 | Shah | ............ | G06F 3/065 |
| 2004/0143562 A1 * | 7/2004 | Chen | ............ | G06F 17/30595 |
| 2009/0276430 A1 * | 11/2009 | Bruso | ............ | G06F 17/30362 |
| 2011/0153674 A1 * | 6/2011 | East | ............ | G06F 17/30312 |
| | | | | 707/797 |
| 2011/0153979 A1 * | 6/2011 | Boyle | ............ | G06F 17/30327 |
| | | | | 711/209 |
| 2013/0318051 A1 * | 11/2013 | Kumar | ............ | G06F 17/30156 |
| | | | | 707/692 |

OTHER PUBLICATIONS

Thwel et al. An Efficient Indexing Mechanism for Data Deduplication—IEEE Xplore Document,2009[online], [retrieved on Jan. 31, 2017]. Retrieved from the Internet <URL: http://ieeexplore.ieee.org/stamp/stamp.jsp?arnumber=5423123>.*
Yan, Fang, and YuAn Tan. "A Method of Object-based De-duplication." JNW 6.12 (2011): 1705-1712.*

* cited by examiner

*Primary Examiner* — Amanda L Willis
*Assistant Examiner* — Vaishali Shah
(74) *Attorney, Agent, or Firm* — Staniford Tomita LLP

(57) ABSTRACT

Embodiments are described for a method and system for improving B+Tree scan performance by receiving a data access instruction that specifies pages to be accessed in a data store utilizing a B+Tree data structure; defining a read-ahead context comprising an array of page numbers corresponding to the specified pages; loading the read-ahead context array into a read-ahead cache; and reading the first page of the read-ahead context in a synchronous manner, and each of the subsequent pages of the read-ahead context in an asynchronous manner.

8 Claims, 5 Drawing Sheets

CONTEXT-BASED READ-AHEAD FOR B+ TREE DATA STRUCTURES IN A DEDUPLICATION SYSTEM

TECHNICAL FIELD

Embodiments are generally directed to computer backup systems, and more specifically to improving the performance of file system scans in a deduplication system.

BACKGROUND

Deduplication is a process for removing redundant data during data backup operations. In particular, if two saved objects are duplicates of each other, only one of the objects is stored, thus reducing the total amount of data being stored. Deduplication has become ubiquitous in capacity optimized storage systems, and relies on a process of comparing byte patterns (data chunks) to stored copies and replacing redundant chunks with reference pointers to identical stored chunks.

Deduplication processes may have an impact on the operation of file systems that organize the data on the storage media. Databases and file systems commonly use a B-tree file structure, as it is optimized for systems that read and write large blocks of data. A B+Tree (and other variants of a standard B-tree) data structure keeps the data sorted on disk and allows update, deletion, insertion and lookups (searches) of records in logarithmic time. Each record in a B+Tree is associated with a key. Non-related records of a B+Tree are generally stored at different locations on the disk, which results in a random access of B+Tree records. However, if the neighboring pages in a B+Tree are adjacent to each other, and are accessed sequentially there is no random read penalty, which results in faster B+Tree scans. In a deduplication system, B+Tree scans may result in a random read. Even in a non-deduplication system, if the neighboring leaf pages are not contiguously stored on disk, scans of the B+Tree will be random; there is no benefit from the lower layers doing the read ahead of contiguous blocks in this scenario as the adjacent nodes of the B+Tree are not contiguous on disk. Thus B+Tree scans will also result in a random read; which may result in B+Tree scans being slow.

What is needed, therefore, is a system and method of speeding scans of B+Trees in deduplication systems.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
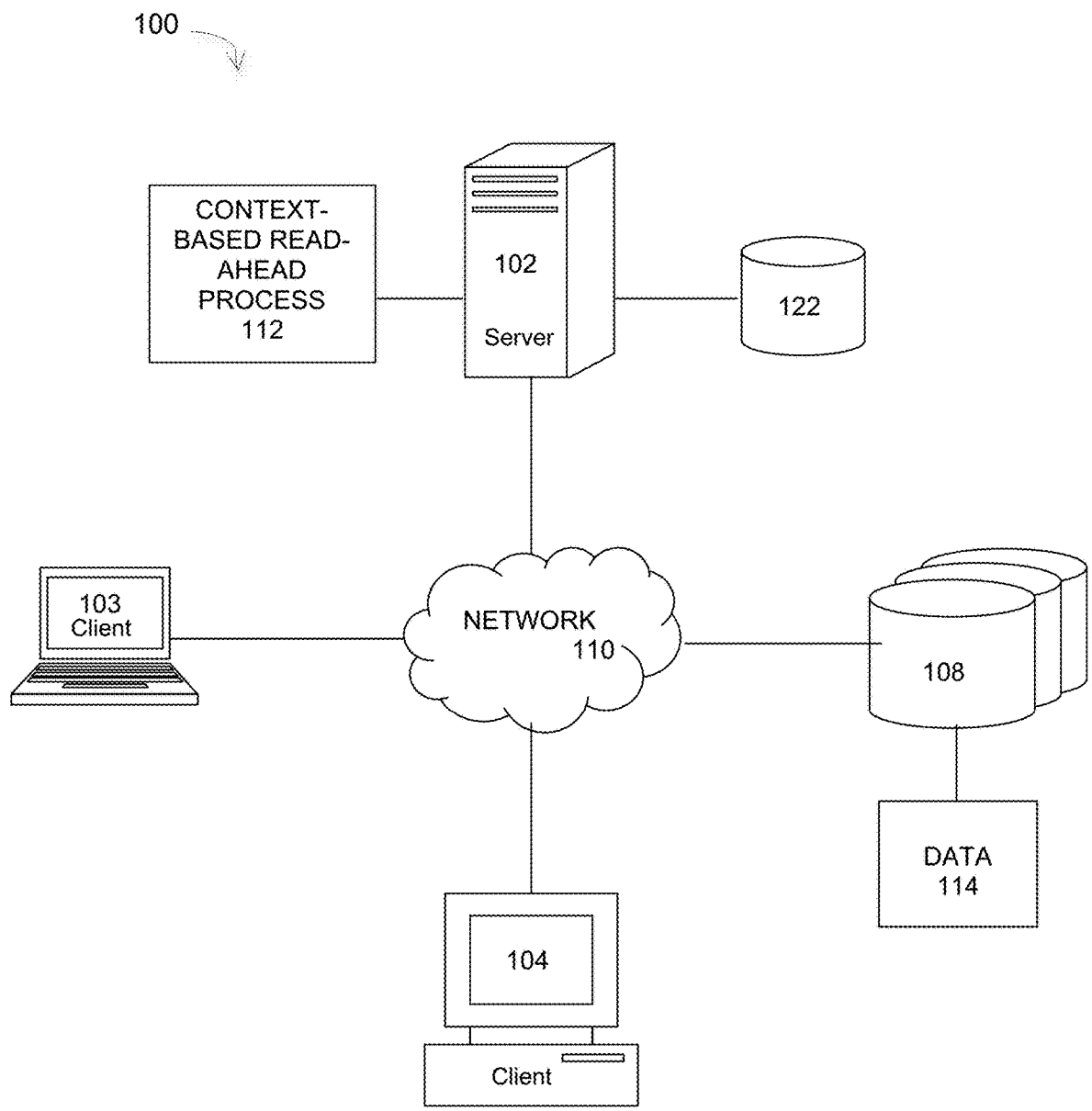
FIG. 1 is a diagram of a networked computer system that implements a context-based read-ahead process for a B+Tree data structure implemented in a deduplication backup system, under some embodiments.

A detailed description of one or more embodiments is provided below along with accompanying figures that illustrate the principles of the invention. While the invention is described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be appreciated that the embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of optimizing data scans of B+Tree structures using a context-based read-ahead cache structure, and a process of performing context-based read ahead operations to improve the scans of B+Tree data structures in a deduplication system. Some embodiments of the invention involve the optimization of backup and recovery software in a distributed system, such as a client-server network, local area network (LAN), wide area network (WAN) or larger scale computer network system; however, those skilled in the art will appreciate that the invention is not limited thereto. Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a networked computer system that implements a context-based read-ahead process for a B+Tree data structure implemented in a deduplication backup system, under some embodiments. In system 100, a network server computer 102 is coupled directly or indirectly, to one or more network client computers 103 and 104 through a network 110. The network interface between server computer 102 and the client computers may include one or more routers that serve to buffer and route the data transmitted between the server and client computers. Network 110 may be the Internet, a Wide Area Network (WAN), a Local Area Network (LAN), or any combination thereof. Network 110 thus provides connectivity to the various systems of FIG. 1 and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform.

A client computer in system 100 may be a workstation computer 104 or it may be a computing device such as a notebook computer 103, personal digital assistant, thin network client device, or the like. The client computer may also be embodied within a mobile communication device that provides a sufficient degree of user input and processing capability to generate and access data to be processed by the network. The client computers may be coupled to the server computer 102 over a wired connection, a wireless connection or any combination thereof that make up at least a portion of network 110. Each client 103 and 104 may run its own respective applications to perform data access operations, such as read and write (R/W) operations on data 114 stored in the network. In an embodiment, one or more clients may be virtual clients, such as in a multi-tenant network in which a server computer (e.g., server 102) runs a single instance of a program serving multiple clients (tenants) in which the program is designed to virtually partition its data so that each client works with its own customized virtual application. It should be noted that there may be any number of clients and any number of servers in system 100.

In one embodiment, server 102 in network system 100 is a server computer that executes a server-side backup process, and such a server may be referred to as a "backup server." Server 102 may represent a deduplication backup server that implements a deduplication data compression method to eliminate duplicate copies of stored data. In an embodiment, the backup process may incorporate or utilize a context-based read-ahead process 112 to speed the scans of B+Tree data used in the deduplication server system. The process 112 may represent one or more executable programs modules that are stored within network server 102 and executed locally within the server. Alternatively, however, it may be stored on a remote storage or processing device coupled to server 102 or network 110 and accessed by the server to be locally executed. In a further alternative embodiment, the process 112 may be implemented in a plurality of different program modules, each of which may be executed by two or more distributed server computers coupled to each other, or to network 110 separately.

The data 114 generated within system 100 may be stored in any number of persistent storage locations and devices, such as local client storage, server storage 122, or network storage 108. In an embodiment network 100 may be implemented to provide support for various storage architectures such as storage area network (SAN), Network-attached Storage (NAS), or Direct-attached Storage (DAS) that make use of large-scale network accessible storage devices 108, such as large capacity tape or drive (optical or magnetic) arrays. In an embodiment, the target storage devices, such as tape or disk array 108 may represent any practical storage device or set of devices, such as tape libraries, virtual tape libraries (VTL), fiber-channel (FC) storage area network devices, and OST (OpenStorage) devices.

Figure 2:
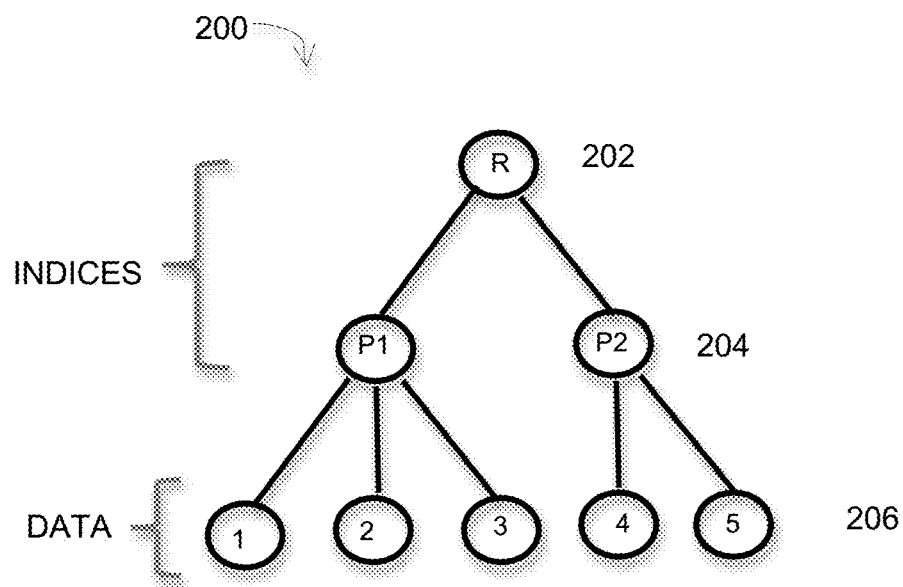
FIG. 2 illustrates an example B+Tree data structure that may be processed according to embodiments.

In an embodiment, data stored in system 100 is stored in a B+Tree data structure. A B+Tree is a particular class of structure generally referred to as a B-tree. A B-tree is a self balancing search tree in which the internal nodes contain a number of keys that act as separation values that divide its subtrees. In a B+Tree, copies of the keys are stored in the internal nodes, keys and records are stored in leaves, and a leaf node may include a pointer to the next leaf node to speed sequential access. FIG. 2 illustrates an example B+Tree data structure that may be processed according to embodiments. As shown in FIG. 2, an example B+Tree 200 has a rootnode 202 (denoted "R"), two internal nodes 204 (denoted P1 and P2), and a number of leaf nodes 206 (denoted 1, 2, 3, 4, 5). The configuration of B+Tree 200 is provided for example only and any number (N) of internal nodes (P1 to Pn) and leaves (1 to x) may be included, though generally only one rootnode (R) is present. Each node is a fixed-size block. The number of internal nodes, N, of children of any node is referred to as the fan-out, and any number of leaves (children) may be connected to each internal node (parents). In a B+Tree, the indices are stored in the rootnode 202 and internal nodes 204, and the data is stored in the leaves 206, or the bottom layer of nodes.

Figure 3:
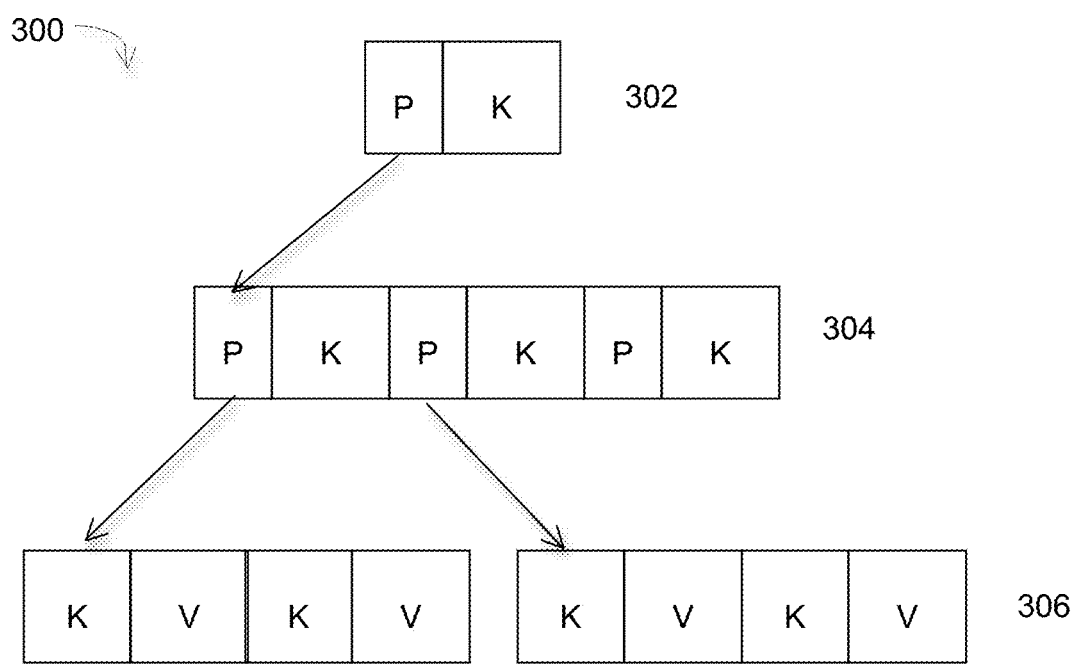
FIG. 3 illustrates a key-value store representation of an example B+Tree for use in a context-based read-ahead process, under some embodiments.

A B+Tree stores data in the form of a key-value store in which the data structure stores pairs of keys and values and retrieves values when a key is known. A traditional B-tree stores key-value pairs (K-V) in all intermediate levels, while a B+Tree generally stores the key-value pairs only at the lowest leaf level. FIG. 3 illustrates a key-value store representation of an example B+Tree for use in a context-based read-ahead process, under some embodiments. As shown in FIG. 3, B+Tree 300 includes a rootnode 302 and an intermediate node level 304. These nodes comprise keys (K) and associated pointers (P) that point to the appropriate keys in the next lower level, and the lowest level 304 contains the key-value pairs (K-V). Although embodiments are described with respect to B+Tree data structures, it should be noted that alternative embodiments are also applicable to other similar data structures in which the data values are stored in the lowest level of the data structure hierarchy.

Figure 4:
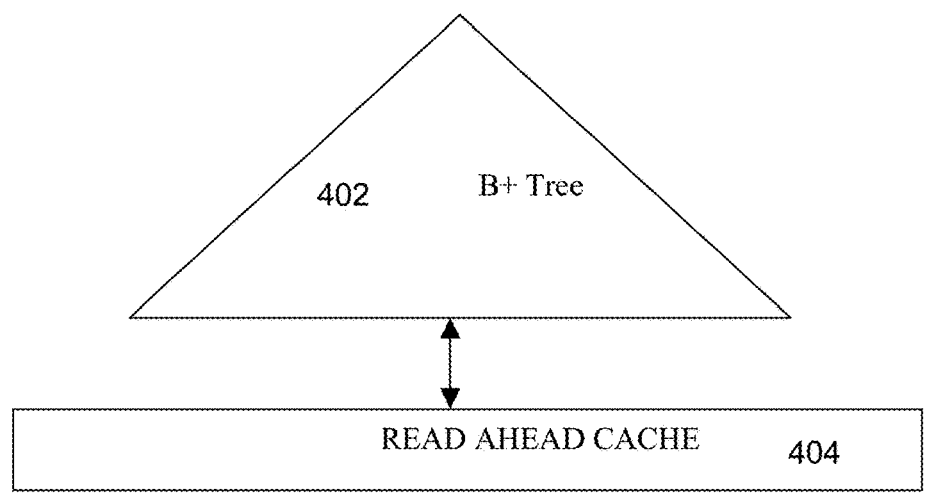
FIG. 4, which illustrates the use of a read-ahead cache in conjunction with a B+Tree to perform context-based data accesses, under some embodiments.

As stated previously, in a deduplication system, B+Tree scans will result in a random read if neighboring leaf pages are not stored contiguously on the disk, which can slow B+Tree scans. In an embodiment, process 112 comprises a context-based read-ahead mechanism that helps improve the speed of scans of B+Trees in a deduplication system. This increases the efficiency of file system operations like the reading of a directory where an intermediate node shows that multiple leaf pages have the same parent node. In an embodiment, the process involves maintaining a small read-ahead cache that is used for reading the B+Tree blocks/pages from the disk in an asynchronous manner. Such a structure or mechanism is illustrated in FIG. 4, which illustrates the use of a read-ahead cache 404 in conjunction with a B+Tree 402 to perform context-based data accesses. In an embodiment, the read-ahead cache 404 is a software structure that is configured to be of a certain size (e.g., in kilobytes) and that is functionally closely coupled to the B+Tree 402. In response to a data access operation (R/W operation) initiated by an instruction, the context-based read-ahead process 112 causes certain data from the B+Tree 402 to be written into the read-ahead cache 404.

In an embodiment, the read-ahead cache 404 is a page cache that is used by the system to pre-fetch data blocks or pages that are to be accessed after a particular block. The read-ahead cache is loaded with page numbers from the B+Tree 402 based on instructions processed by the I/O layer. These instructions provide the proper context that allows the system to load the proper pages into the read-ahead cache. In general, a file system is not particularly intelligent with respect to responding on series of commands. Present file system scans operate on a series of synchronous responses. For example, a scan of a number blocks will return each block synchronously and one at a time with each scan instruction. This results in heavy I/O overhead for scans that involve many pages. In an embodiment, the context-based read-ahead process 112 utilizes the fact that a scan operation typically involves a linear fetch of data. After a first page is returned in response to a scan operation, the subsequent pages are loaded into pre-fetch window for loading into the read-ahead cache. The first page is thus read synchronously with the scan operation, but subsequent pages are read asynchronously from the read-ahead cache, thus greatly speeding the I/O operation of the system. This is especially useful in deduplication systems in which only a single copy of each data object is stored in the storage media. The asynchronous nature of the subsequent page accesses requires no waiting for acknowledgment from the I/O layer, unlike a synchronous access in which each access requires an acknowledgement from the I/O layer, thus there is minimal blocking or waiting on the I/O layer for subsequent pages in a scan operation using the context-based read-ahead process 112. For example, if the data set comprises a set of photographs that are catalogued by date, and the file system scan request comprises a fetch of all photos taken on a certain day, prior art systems would fetch each photo synchronously one at a time. In contrast, the context-based read ahead process would fetch the first photo synchronously and each of the remaining figures in the data set asynchronously. An interface with the I/O layer provides the process with intelligence to know that the scan is linear with regard to the data set based on the user specified scan request, and the pre-fetch window (array) uses this to fill the read-ahead cache so that the subsequent pages can be provided asynchronously and much faster.

Figure 5:
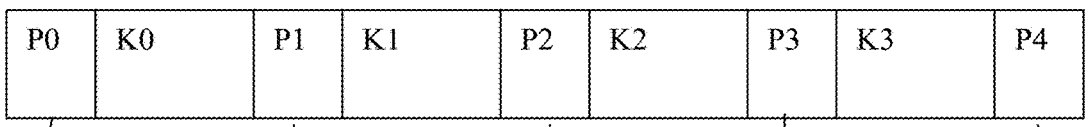
FIG. 5 illustrates the functional operation of a context-based read-ahead process, under some embodiments.
Figure 5:
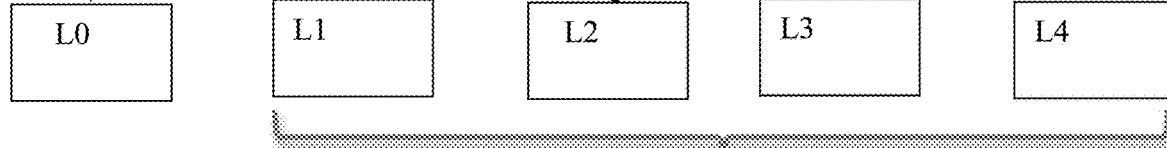
Figure 5:
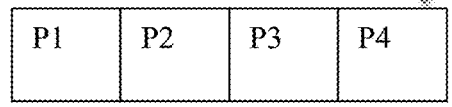
Figure 5:
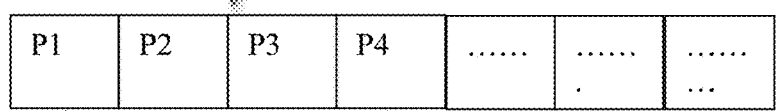
Figure 5:
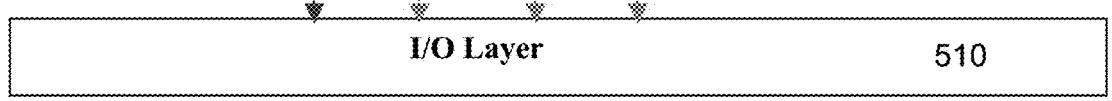

FIG. 5 illustrates the functional operation of a context-based read-ahead process, under some embodiments. As shown in FIG. 5, an internal node layer of the B+Tree comprises a number of pointer and key pairs denoted P0-K0, P1-K1, to Pn-Kn. The pointers Px point to respective leaf pages 504 denoted L0, L1, to Ln. The process then prepares a read-ahead context 506 based on the pointers. The read-ahead context 506 is an array of page numbers that is prepared by loading the pointers after the first scan leaf page. For the example case of FIG. 5, the read ahead context comprises the pointers P1, P2, P3, and P4. As shown in FIG. 5, a current read is done at leaf page P1, and the subsequent pages following the leaf pages P1 from the internal node 502 are recorded in the read ahead context 506. The size of the example read-ahead window in FIG. 5 is three, which consists of present leaf page L1 (P1) and other three leaf pages L2 (P2), L3 (P3), and L4 (P4) leaf pages, the page number of the leaf pages 504 are recorded in the read-ahead context 506. The read ahead context array is passed to the cache layer 508. The cache layer maintains an array of pages that are consumed in a rotating log fashion. The read-ahead context 506 gets an array of pages from the cache layer, the number of pages obtained from the cache layer is equal to the read ahead window size. The first page in the read ahead context is read synchronously. This is the page which is currently being referenced; other pages in the read ahead context will be referenced in future, which are read asynchronously from the I/O layer 510. Thus, as shown in FIG. 5, L1 is the leaf page that is read synchronously, other leaf pages L2, L3 and L4 are read asynchronously as a batch.

The read-ahead context 506 and the portion of this context that is loaded into the read-ahead cache 508 represents a pre-fetch window. In an embodiment, the window size is flexible, and the size of each block or page is fixed by the system. The window size may be set by user input, or application setting. In general, a larger window size can be selected for more aggressive caching and prefetching, but may have an adverse effect on I/O performance.

Figure 6:
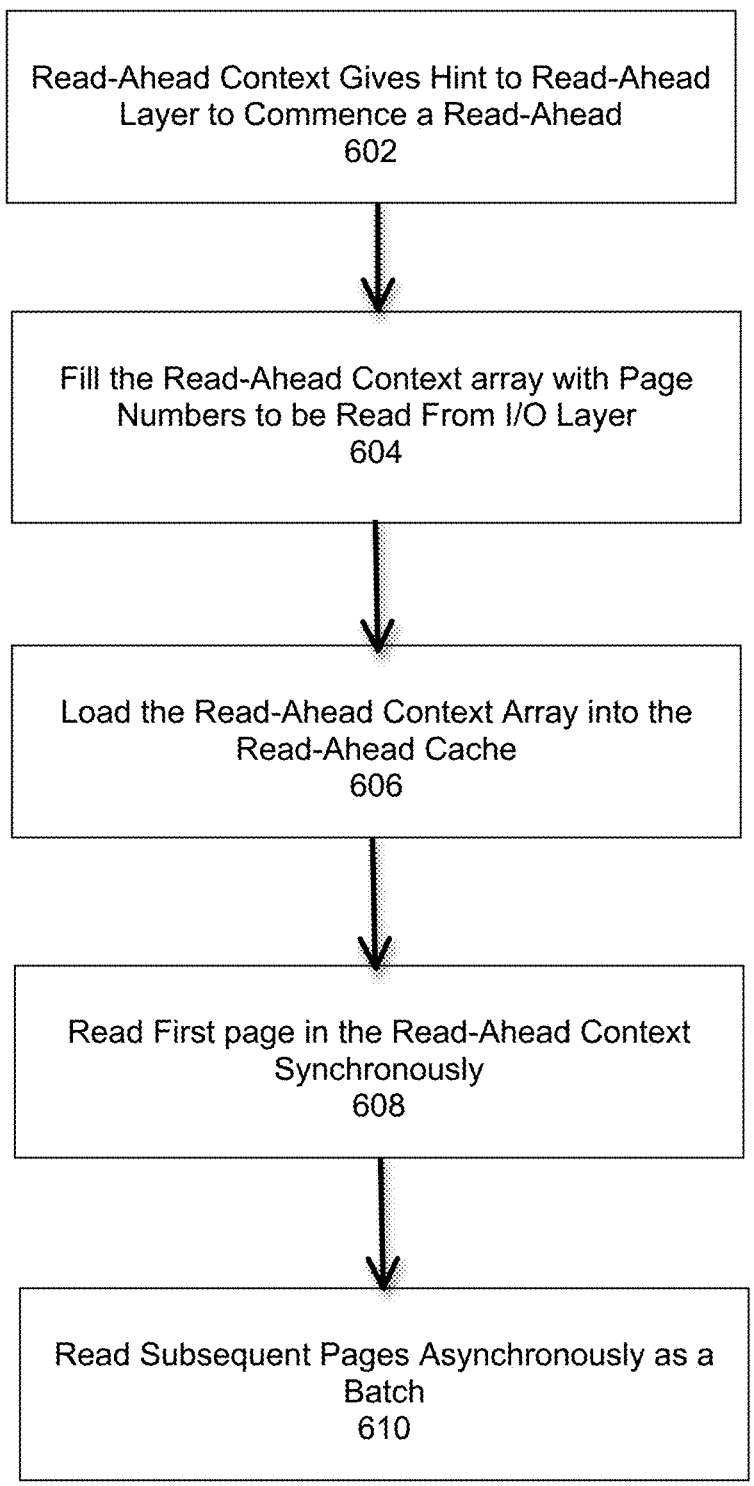
FIG. 6 is a flowchart that illustrates a method of performing a read-ahead context-based B+Tree scan, under an embodiment.

FIG. 6 is a flowchart that illustrates a method of performing a read-ahead context-based B+Tree scan, under an embodiment. This method acts on data access operations that may be initiated by a user or application to search for and find data stored in the system and that are catalogued by date and time of creation. In this case, the indices for these data objects are time/date stamps that are stored in the node for each data object. For example, the query may be a search for photos or messages regarding a certain time or place. The search may be for all photos during a certain day, or photos taken every other day, and so on. In general, the B+Tree interacts with the read ahead cache 508 to read the pages from the lower I/O layer 510. As shown in the process of FIG. 6, the read-ahead context starts with giving a hint to the read ahead layer to start doing a read ahead operation, block 602. When the read ahead operation starts, it fills up the read ahead context, which is an array of page numbers that needs to be read from the I/O layer, block 604. The number of pages that can be read is called the read ahead window. This context is loaded into the read-ahead cache 508 from the input/output (I/O) layer, block 606. This cache maintains an array of pages that are consumed in a rotating log fashion so that once the cache is filled, new entries overwrite the first and successive subsequent entries. The first leaf page (e.g., P1) is accessed synchronously in accordance with the data access operation, block 608, and the subsequent pages (e.g., P2, P3, and P4) are accessed asynchronously as a batch, block 610.

In an embodiment, the hint 602 comprises the number of subsequent pages after a first page specified by the scan operation. This is provided by the user input through the I/O layer. Thus, if the user request says: "I want pages P1-P4" the P1 page is returned this is synchronous with request, the I/O than figures out that the subsequent pages are P2, P3, and P4. These pages are provided to process 112 which generates the pre-fetch window by loading these pages into the read-ahead cache. These pages P2-P4 are then read asynchronously using the read-ahead cache. Thus, the intelligent context-based process layer provides the read-ahead array, which is filled by user input to the I/O layer. In this manner, the combination of the user input through the I/O layer with the context-based read-ahead window mechanism allows a scan of multiple pages to be performed much more quickly than a traditional synchronous access as performed in systems that do not take into consideration the user input and the I/O layer processing. Any number or sequence of pages may be loaded into the read-ahead cache, depending on the user input and the size of the pre-fetch window. For example, the pre-fetch array can be pages P1-P4, or pages P1, P3, P5, P7, and so on, based on the user input.

Figure 7:
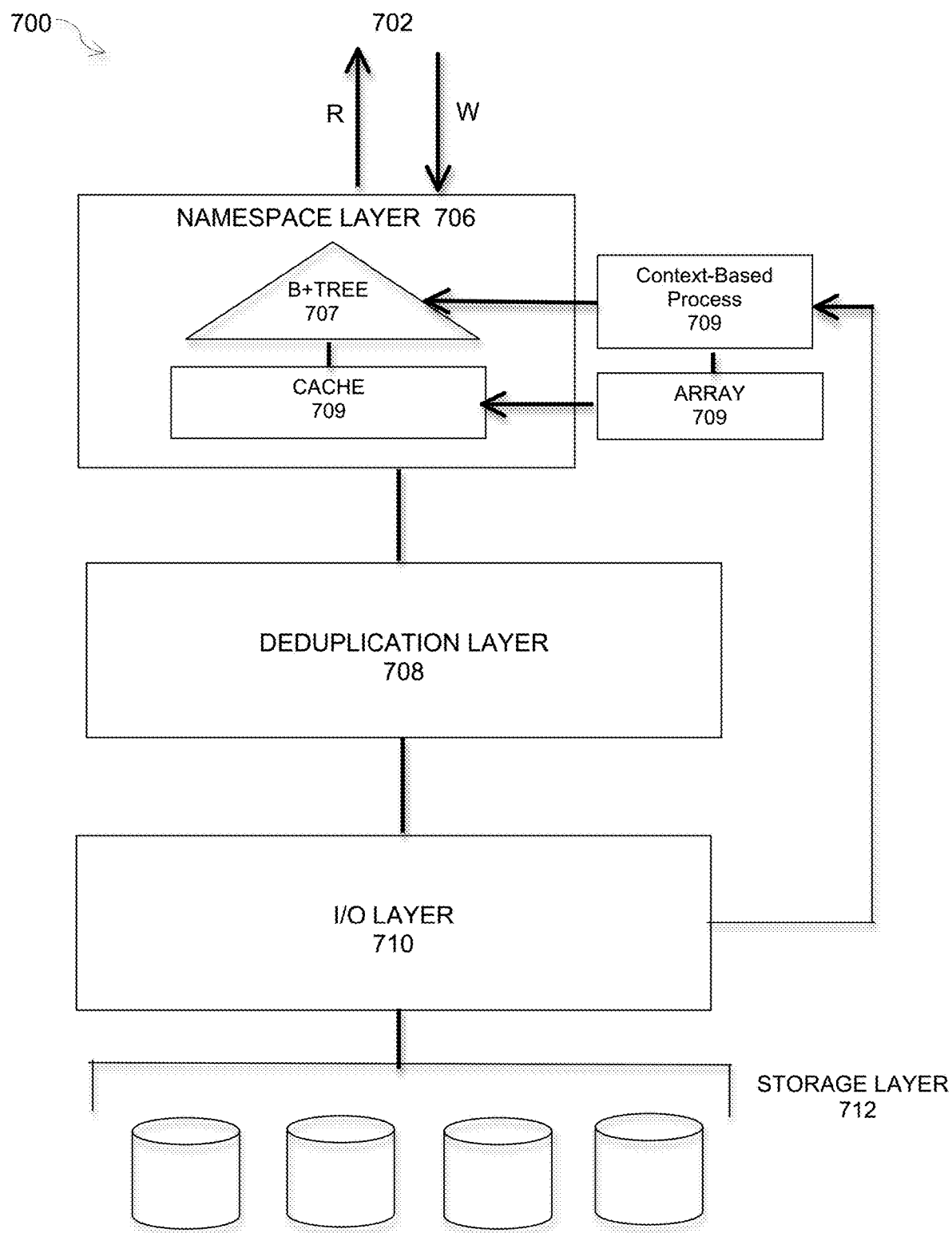
FIG. 7 is a block diagram that illustrates a context-based read-ahead cache in a deduplication system, under some embodiments.

FIG. 7 is a block diagram that illustrates a context-based read-ahead cache in a deduplication system, under some embodiments. As shown in diagram 700, data accesses 702 comprising read and write operations are input to a namespace layer 706. The namespace layer 706 stores the B+Tree data structure 707 of the files. The user input operations 702 involve a scan of the B+Tree 707 that provides the data structure for data stored in the disks of the storage layer 712. Deduplication layer 708 performs the data compression algorithms that prevent duplicate copies of data objects from being stored in the storage layer 712. The I/O layer 710 fetches the blocks in response to the user input scan request. For the embodiment of system 700, the I/O layer is functionally coupled to the namespace layer 706 through a context-based read ahead-process 709. This process uses the hint provided by the user input scan operation to fill the pre-fetch window or read-ahead array 709 with the first page and any subsequent pages of the scan request. These pages are loaded into the read-ahead cache 709 so that the first page (P1) is read synchronously, while the subsequent pages (e.g., P2-Pn) are read asynchronously.

Embodiments are described herein for a method of performing a file system scan operation by receiving a data access instruction that specifies pages to be accessed in a data store utilizing a B+Tree data structure, defining a read-ahead context comprising an array of page numbers corresponding to the specified pages, loading the read-ahead context array into a read-ahead cache, and reading the first page of the read-ahead context in a synchronous manner, and each of the subsequent pages of the read-ahead context in an asynchronous manner. Embodiments are further described for a system comprising a namespace layer comprising a B+Tree directory structure organizing data stored in a storage layer having a plurality of storage media, an input/output layer fetching data blocks from the storage layer in response to user input; and a context-based read-ahead component coupled between the input/output layer and the namespace layer, and configured to populate a read-ahead array with pages responsive to the user input, and wherein at least some of the pages are read asynchronously with respect to the user input.

Although embodiments are described with respect to deduplication backup systems, it should be noted that aspects of the methods and systems described herein may also be applied to non-deduplication as systems as well.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing deduplication backup operations of data maintained by a file system in a multi-layer deduplication backup system, comprising:

maintaining a read-ahead cache between a deduplication layer executing the deduplication backup operations in which only a single copy of each data object is stored, and a namespace layer storing a B+Tree data structure of files processed by the backup operations, wherein the B+Tree stores key-value pairs in a lowest level of a tree structure, the key-value pairs representing pointers that point to pages to be accessed in response to a backup operation;

receiving, from a user scan request requiring multiple synchronous responses by the file system to an I/O layer coupled between the deduplication layer and a storage layer containing storage devices, a data access instruction that specifies the pages to be accessed in a data store contained in the storage layer, wherein the read-ahead cache reads the pages from the I/O layer;

storing in the B+Tree, page numbers of pages following a first page of data and forming a linear set of data allowing batch processed, context-based data accesses by the backup system using both synchronous and asynchronous accesses of the data stored in the B+Tree, wherein the pages following the first page of data are catalogued by date and time of creation;

reading the first page of the pages synchronously with a scan operation performed on blocks of the files;

preparing a read-ahead context array using pointers of pointer and key pairs of the B+Tree, wherein the pointers point to respective leaf pages of the B+Tree, by loading pointers for pages after the first page based on a hint provided as user input and comprising an identification of specific subsequent pages after the first page, wherein the specific subsequent pages may not be sequential pages;

loading from the read-ahead context array, the read-ahead cache with a plurality of subsequent pages of the specific subsequent pages based on an indication of linear access based on temporal parameters, and an indication of a number of the plurality of subsequent pages after the first page as specified in the scan operation; and reading, through I/O layer fetches, the plurality of subsequent pages asynchronously with the scan operation from the read-ahead cache, and as a single batch of pages, so as to require no waiting for acknowledgement from the I/O layer for each of the subsequent page reads in which the subsequent pages are not stored contiguously the storage devices and in which a B+Tree scan results in random reads for the deduplication backup operations.

2. The method of claim 1 wherein the read-ahead cache is configured to be of a defined size determined by the number of the plurality of subsequent pages, and wherein the read-ahead cache represents pre-fetch window for a context of the scan operation, and further wherein the indication of linear access corresponds to a respective date and time of creation for each page of the plurality of subsequent pages.

3. The method of claim 2 further comprising maintaining an array of the first and plurality of subsequent pages in the read-ahead cache in a rotating log manner.

4. The method of claim 2 wherein the read ahead context array comprises an array of page numbers prepared by loading pointers after a first scan leaf page of the B+Tree data structure.

5. The method of claim 4 wherein a number of pages obtained from the read ahead cache is equal to a read ahead window size.

6. The method of claim 5 wherein the multiple sequential pages are automatically catalogued based on a creation time and are indexed by the pointers loaded after the first scan leaf page.

7. The method of claim 4 wherein the B+Tree references data stored in the storage layer, and wherein the pages comprise a single copy of data objects stored in the data store.

8. A computer program product comprising a non-transitory computer usable medium having machine readable code embodied therein for performing deduplication backup operations of data maintained by a file system in a multi-layer deduplication backup system, by:

maintaining a read-ahead cache between a deduplication layer executing the deduplication backup operations, and a namespace layer storing a B+Tree data structure of files processed by the backup operations in which only a single copy of each data object is stored, wherein the B+Tree stores key-value pairs in a lowest level of a tree structure, the key-value pairs representing pointers that point to pages to be accessed in response to a backup operation;

receiving, from a user scan request requiring multiple synchronous responses by the file system to an I/O layer coupled between the deduplication layer and a storage layer containing storage devices, a data access instruction that specifies the pages to be accessed in a data store contained in the storage layer, wherein the read-ahead cache reads the pages from the I/O layer;

storing in the B+Tree, page numbers of pages following a first page of data and forming a linear set of data allowing batch processed, context-based data accesses by the backup system using both synchronous and asynchronous accesses of the data stored in the B+Tree, wherein the pages following the first page of data are catalogued by date and time of creation;

reading the first page of the pages synchronously with a scan operation performed on blocks of the files;

preparing a read-ahead context array using pointers of pointer and key pairs of the B+Tree, wherein the pointers point to respective leaf pages of the B+Tree, by loading pointers for pages after the first page based on a hint provided as user input and comprising an identification of specific subsequent pages after the first page, wherein the specific subsequent pages may not be sequential pages;

loading from the read-ahead context array, the read-ahead cache with a plurality of subsequent pages of the specific subsequent pages based on an indication of linear access based on temporal parameters, and an indication of a number of the plurality of subsequent pages after the first page as specified in the scan operation; and reading, through I/O layer fetches, the plurality of subsequent pages asynchronously with the scan operation from the read-ahead cache, and as a single batch of pages, so as to require no waiting for acknowledgement from the I/O layer for each of the subsequent page reads in which the subsequent pages are not stored contiguously the storage devices and in which a B+Tree scan results in random reads for the deduplication backup operations.

* * * * *